United States Patent [19]

Hashimoto et al.

[11] 4,330,210
[45] * May 18, 1982

[54] SPECTROPHOTOMETER CAPABLE OF CORRECTING A DARK CURRENT

[75] Inventors: Noriyoshi Hashimoto, Chofu; Mikio Ito; Kikuo Tamura, both of Yokohama, all of Japan

[73] Assignee: Nippon Kogaku K.K., Tokyo, Japan

[ * ] Notice: The portion of the term of this patent subsequent to Mar. 23, 1999, has been disclaimed.

[21] Appl. No.: 69,926

[22] Filed: Aug. 27, 1979

[30] Foreign Application Priority Data

Aug. 28, 1978 [JP] Japan .................................. 53-103789

[51] Int. Cl.³ ............................................. G01J 3/38
[52] U.S. Cl. ..................................... 356/328; 356/308
[58] Field of Search ................ 364/498, 526; 356/307, 356/308, 309, 319, 320, 323-326, 328, 332, 334

[56] References Cited

U.S. PATENT DOCUMENTS

| | | | |
|---|---|---|---|
| 3,695,764 | 10/1972 | Delmas et al. | 356/334 X |
| 3,711,708 | 1/1973 | Dolin et al. | 356/325 X |
| 3,874,799 | 4/1975 | Isaacs et al. | 356/323 X |
| 4,158,505 | 6/1979 | Mathisen et al. | 356/323 X |

FOREIGN PATENT DOCUMENTS 2814358 11/1978 Fed. Rep. of Germany ...... 356/319

Primary Examiner—F. L. Evans
Attorney, Agent, or Firm—Fitzpatrick, Cella, Harper & Scinto

[57] ABSTRACT

This specification discloses a dark current correcting device in a spectrophotometer utilizing, as the photoelectric converting element, an image sensor capable of electrical scanning such as a photo-diode array to improve the scanning speed and the reliability, thus eliminating the error component by the dark current from the photoelectric conversion signal obtained from each photoelectric converting element of the image sensor and enabling obtainment of a true photoelectric conversion signal.

4 Claims, 3 Drawing Figures

SPECTROPHOTOMETER CAPABLE OF CORRECTING A DARK CURRENT

BACKGROUND OF THE INVENTION

1. Field of the Invention

This invention relates to a spectrophotometer, and particularly to a spectrophotometer having a dark current correcting device for eliminating the influence of the dark current of photoelectric converting elements.

2. Description of the Prior Art

There are already known spectrophotometers in which, for photoelectrical detection of the light of a desired wavelength out of spectrum mechanical scanning is made with a diffracting element or a photoelectrical converting element, thus achieving spectral measurement by the correspondence between the spatial position of said element and the wavelength.

However, such mechanical scanning with the diffracting element or photoelectrical converting element is not satisfactory in consideration of the scanning speed or the reliability.

SUMMARY OF THE INVENTION

It is an object of the present invention to provide a dark current correcting device in a spectrophotometer utilizing, as the photoelectrical converting element, an image sensor capable of electrical scanning such as a photodiode array to improve the scanning speed and the reliability, thus eliminating the error component by the dark current from the photoelectric conversion signal obtained from each photoelectrical converting element of the image sensor and enabling obtainment of a true photoelectric conversion signal.

The invention will become fully apparent from the following detailed description thereof taken in conjunction with the accompanying drawings.

DESCRIPTION OF THE PREFERRED EMBODIMENTS

Figure 1:
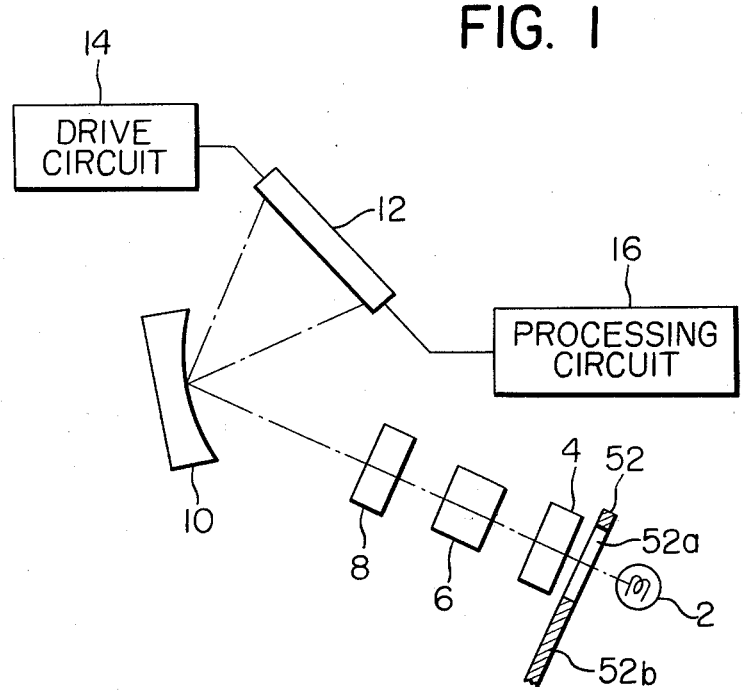
FIG. 1 shows the optical arrangement of the spectrophotometer according to the present invention.

An embodiment of the optical system used in the spectrophotometer of the present invention will be briefly described by reference to FIG. 1. A light beam emitted by a light source 2 is collimated by a first optical system 4, then passes through a sample in a cell 6 and a second optical system 8, and is diffracted by a concave diffraction grating 10 and focused on a one-dimensional image sensor 12. In this arrangement, the beam of a particular wavelength diffracted by the concave diffraction grating 10 is always focused to a particular position on said one-dimensional image sensor 12. The one-dimensional image sensor 12 is composed of a semiconductor photoelectrical converting element such as a MOS photodiode array and is structured to release the photoelectrically converted signals time sequentially from the photoelectric converting element at one end to the other in synchronization with clock pulses supplied from a drive circuit 14. The photoelectric conversion output signals of the one-dimensional image sensor 2 are sequentially received by a processing circuit 16 and suitably treated therein.

The aforementioned concave diffraction grating may be replaced by a diffracting element such as a prism or the like.

Figure 2:
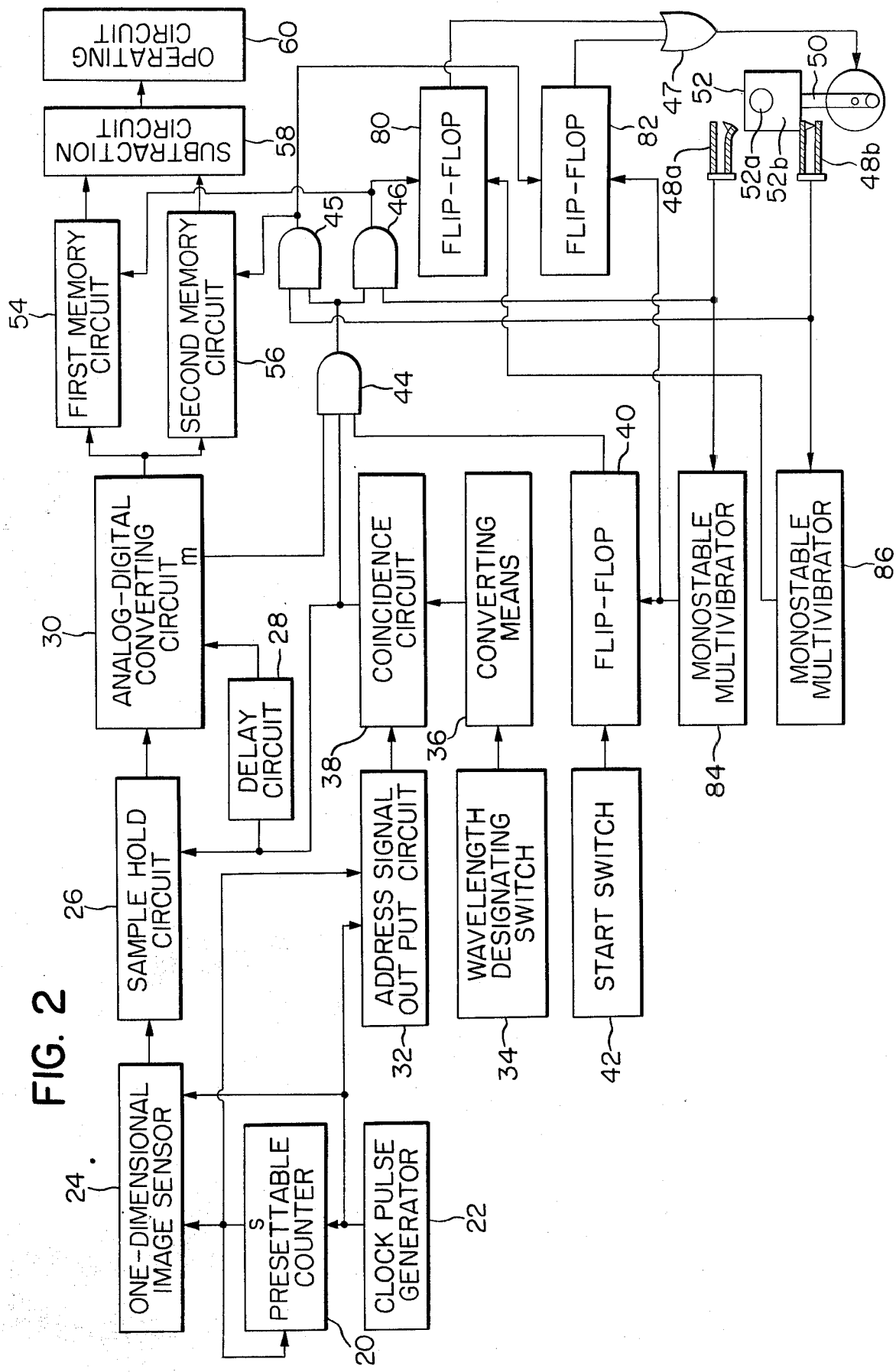
FIG. 2 shows the electrical processing system of the spectrophotometer embodying the present invention.

FIG. 2 shows the basic construction of an embodiment. A presettable counter 20 counts the clock pulses from a clock pulse generator 22 and, upon completion of counting of a predetermined number, releases a carry signal from an output terminal S. The carry signal is utilized as the preset pulse for the presettable counter 20. A one-dimensional image sensor 24 performs a scanning function by the clock pulses from the clock pulse generator 22 supplied after the release of said carry signal from the presettable counter 20. In this manner, the one-dimensional image sensor 24 produces time sequential photoelectrical conversion signals in synchronization with the clock pulses and corresponding to the amounts of light received by the photoelectric converting elements. A sample hold circuit 26 is adapted to perform sample holding on the photoelectric conversion signals generated from the one-dimensional image sensor 24 in synchronization with the output pulses from a coincidence circuit 38 which will hereinafter be described. A delay circuit 28 serves to delay the output pulses from the coincidence circuit 38 in such a manner that the output signals from said sample hold circuit 26 are subjected, after stabilization thereof, to analog-digital conversion in an analog-digital converting circuit 30. The analog-digital converting circuit 30 receives, as the conversion starting signal, the output pulse from the coincidence circuit 38 delayed by the delay circuit 28 and converts the output signals of the sample hold circuit 26 into digital signals and puts out the same and, upon completion of the conversion, produces a conversion completion signal from a terminal m. Such analog-digital converting circuit is commercially available as a monolithic element and that may be utilized. An address signal output circuit 32 is composed of a counter for counting the clock pulses received from the clock pulse generator 22 after the production of the carry signal from the presettable counter 20 and generates the counted number corresponding to the currently driven address of the one-dimensional image sensor 24. A wavelength designating switch 34 is composed of a digital switch, a snap switch or the like to allow the user to select an arbitrary wavelength. A converting means 36 converts the output of the wavelength designating switch 34 into a value corresponding to the address of the photoelectric converting elements so as to allow the comparison of the output of said wavelength designating switch 34 with that of the address signal output circuit 32 in the coincidence circuit 38. Since the light of a particular wavelength is always received by a particular photoelectric converting element on the one-dimensional image sensor, said converting means 36 can be easily composed, for example, of a read-only memory making correspondence between the addresses of the converting elements and the wavelengths. The coincidence circuit 38 receives the output from the address signal output circuit 32 and that from the converting circuit 36, and produces a coincidence signal when said both outputs coincide with each other. A flip-flop 40 is set by closing of a start switch 42 to generate a set signal. An AND gate 44 is opened upon simultaneous receipt of the conversion completion signal from the analog-digital converting circuit 30, the coincidence signal from the coincidence circuit 38 and the set signal from said flip-flop 40 to produce a logic "1" signal. As the initial state before the start switch 42 is closed, an operating plate 52 is closing a switch 48a and flip-flops 80 and 82 are set to put out logic "0" signals.

Switches 48a and 48b, when closed, put out logic "1" signals. Since the switch 48a is closed in the initial state, the gate 46 is opened and the logic "1" signal of the gate 44 passes through the gate 46 to a first memory circuit 54. Therefore, the output signal from the analog-digital converting 30 is written into the first memory circuit 54. At the same time, the logic "1" output signal of the gate 44 passed through the gate 46 sets the flip-flop 80, the output of which is applied through an OR gate 47 to a motor, thus starting to rotate the motor. With the rotation of the motor, the operating plate 52 is lowered to close the switch 48b as shown. By the logic "1" output signal produced upon closing of the switch 48b, a monostable multivibrator 86 produces pulses. By these pulses, the flip-flop 80 is reset to stop the motor from rotating. Therewith, the gate 45 is opened by a logic "1" output signal produced upon closing of the switch 48b. Therefore, the logic "1" output signal of the gate 44 in this state passes through the gate 45 to a second memory circuit 56 and writes the output signal of the analog-digital converter 30 into the second memory circuit 56. On the other hand, the logic "1" output signal of the gate 44 passed through the gate 45 sets the flip-flop 82 and passes through the OR gate 47 to the motor, thus rotating the motor again. By the rotation of the motor, the operating plate 52 is moved upwardly to close the switch 48a again. Designated by 84 is a circuit for detecting the shift of the switch 48a from its open position to its closed position (namely, from logic "0" to logic "1"). The circuit 84 is comprised of a monostable multivibrator. When the switch 48a is closed, the monostable multivibrator 84 produces pulses to reset the flip-flops 40 and 82. As the result, the motor is stopped from rotating and the gate 44 is closed, whereafter the write-in signal is not applied to the memory circuit.

By so designating the wavelength extraneously and applying the start, the output of the image sensor with the switches 48a and 48b closed may be stored.

The operating plate 52 has a light-transmitting portion 52a and a light-intercepting portion 52b, so that the light beam is incident on the image sensor when the switch 48b is closed and the light beam to be incident on the image sensor is intercepted when the switch 48a is closed. Accordingly, by closing the start switch 42, the output of the image sensor in the light-intercepted condition is stored in a first memory circuit 54 and the output of the image sensor in the light-transmitted condition is stored in in a second memory circuit 56.

A subtraction circuit 58 subtracts the stored content of the second memory circuit 56 from the stored content of the first memory circuit 54. The result of the subtraction effected by the subtraction circuit 58 is applied to an operating circuit 60 as a true data which is not affected by a dark current, and suitably treated therein.

Figure 3:
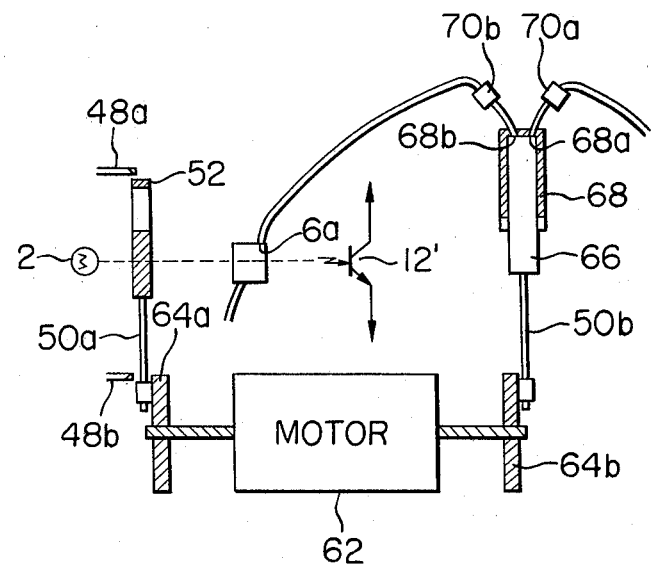
FIG. 3 shows the crank mechanism according to the present invention.

Reference is now had to FIG. 3 to describe a crank mechanism for moving up and down the operating plate 52. A motor 62 is a two-shaft motor and discs 64a and 64b are secured onto the respective shafts. Eccentric crank arms 50a and 50b are rotatably coupled to the discs 64a and 64b, respectively. The crank arm 50a has the operating plate 52 rotatably connected thereto, and the crank arm 50b has a piston 66 rotatably connected thereto. The two crank arms respectively constitute crank mechanisms. Thus, by rotation of the motor shafts, the operating plate 52 and the piston 66 are moved up and down. A cylinder 68 has an outlet port 68a and an inlet port 68b. The inlet port 68a of the cylinder is connected to the outlet port 6a of the cell 6 through an admission valve 70b, and the outlet port 68b of the cylinder is connected to an unshown exhaust liquid reservoir through a discharge valve 70a. The inlet port 6b of the cell 6 is immersed in unshown sample liquid.

With such a construction, the start switch 42 is closed and at the same time, an arbitrary wavelength is designated by the wavelength designating switch 34. Thereupon, the output electrical signal in the light-intercepted condition from the photoelectric converting element 12' (FIG. 3) which is in a position for receiving the light of the wavelength designated by the wavelength designating switch 34 is applied to the first memory circuit 54. The motor 62 starts to rotate from when the operating plate 52 and the piston 66 have come to their uppermost positions as shown in FIG. 3, and when the operating plate 52 and the piston 66 begin to lower, the switch 48a is opened and with the lowering of the piston 66, the sample in the cell 6 (the sample which has been measured) is transferred into the cylinder 68 through the admission valve 70b and at the same time, a new sample is introduced into the cell 6. When the piston 66 has come to its lowermost position, the cell 6 is filled with a new sample and at the same time, the operating plate 52 comes to its lowermost position, whereby the light from the light source 2 enters the cell 6 through the light-transmitting portion 52a. At this time, the switch 48b is closed as shown in FIG. 2, so that a photoelectric conversion signal proportional to the quantity of light passed through the sample in the cell 6 is stored in the second memory circuit 56. When the piston begins to move up again, the sample in the cylinder 68 which has already been measured is discharged into the exhaust liquid reservoir through the discharge valve 70a. On the other hand, the operating plate 52 also moves up and when it comes to its uppermost position, the switch 48a is closed and the operating plate comes to a halt.

The subtraction circuit 58 effects a substraction between the first and second memory circuits 54 and 56 and the result thereof is applied to the operating circuit 60.

In the above-described embodiment, mechanical switches adapted to be directly closed by the operating plate 52 are used as the switches 48a and 48b, but alternatively photoelectrical switches or the like may be employed. Also, in FIG. 2, an example in which the operating plate 52 is inserted just before the light source 2 is shown, but the operating plate 52 may of course be positioned at other place. The up and down movement of the operating plate 52 may also be accomplished by other mechanism than the crank mechanism, and the operating plate 52 may be replaced by a rotatable member such as a chopper. Use may also be made of an electro-optical light control element such as liquid crystal or electrochromic element which selects light and dark by a voltage applied.

According to the present invention, as has hitherto been described, the error component by the dark current or the like may be eliminated from the photoelectric convertion signal obtained from each photoelectric converting element of the image sensor, by a simple structure.

We claim:

1. A spectrophotometer provided with a diffracting element for spectroscopically dividing the light from a light source, comprising:

an image sensor adapted to receive the light spectroscopically divided by said diffracting element at photoelectric converting elements corresponding to different wavelengths;

driving means for the image sensor for sequentially driving the photoelectric converting elements of said image sensor and for causing said image sensor to put out time sequential photoelectric conversion signals;

wavelength designating means having a wavelength designating portion which can designate an arbitrary wavelength externally, the wavelength designating means putting out a wavelength signal corresponding to the designated wavelength;

address signal output means for putting out respective address signals in synchronism with the driving of the photoelectric converting elements of said image sensor;

coincidence signal output means for receiving and comparing said wavelength signal and said address signal and for putting out a coincidence signal when said wavelength signal and said address signal correspond to each other;

gate means for receiving electrical signals time-sequentially put out by said image sensor and putting out said electrical signal synchronized with said coincidence signal;

light-intercepting means for shielding the photoelectric converting elements of said image sensor from light;

memory means having first and second memory portions for discretely storing the electrical signal put out by said gate means depending on whether or not the photoelectric converting elements of said image sensor are shielded from light; and a subtraction circuit for subtracting the stored content of said second memory portion from the stored content of said first memory portion.

2. A spectrophotometer according to claim 1, wherein said light-intercepting means includes a light-intercepting plate removably inserted in the light path between the light source and the photoelectric converting elements of said image sensor.

3. A spectrophotometer according to claim 2, wherein said memory means further includes first switch means adapted to conduct when said light-intercepting plate is inserted in said light path and second switch means adapted to conduct when said light-intercepting plate is removed from said light path, said first switch means being connected between said gate means and said first memory portion, said second switch means being connected between said gate means and said second memory portion.

4. A spectrophotometer according to claim 3, wherein said first switch means (48a, 46) includes a first detection switch (48a) for detecting that said light-intercepting plate is in a first position and for putting out a first signal when said light-intercepting plate is in said first position, and a first gate circuit (46) for passing therethrough the output of said gate means when said first detection switch puts out said first signal, and said second switch means (48b, 45) includes a second detection switch (48b) for detecting that said light-intercepting plate is in a second position and for putting out a second signal when said light-intercepting plate is in said second position, and a second gate circuit (45) for passing therethrough the output of said gate means when said second detection switch puts out said second signal.

* * * * *